(12) United States Patent
Dang et al.

(10) Patent No.: US 6,887,940 B2
(45) Date of Patent: May 3, 2005

(54) COMPATIBILIZING AGENT FOR ENGINEERING THERMOPLASTIC/ POLYOLEFIN BLEND

(75) Inventors: Vu A. Dang, Bear, DE (US); Dinshong Dong, Hockessin, DE (US); Tam T. M. Phan, Bear, DE (US); Cheng Q. Song, Wilmington, DE (US)

(73) Assignee: Basell Poliolefine Italia S.p.A., Milan (IT)

( * ) Notice: Subject to any disclaimer, the term of this patent is extended or adjusted under 35 U.S.C. 154(b) by 23 days.

(21) Appl. No.: 10/305,816

(22) Filed: Nov. 27, 2002

(65) Prior Publication Data

US 2004/0102581 A1 May 27, 2004

(51) Int. Cl.$^7$ .............................. C08F 8/00; C08L 23/00; C08L 23/04; C08L 33/04; C08L 35/02
(52) U.S. Cl. ..................... 525/191; 525/192; 525/194; 525/195; 525/196; 525/197; 525/198; 525/217; 525/222; 525/225; 525/232; 525/240; 525/262; 525/263; 525/266
(58) Field of Search ................................ 525/191, 192, 525/194, 195, 196, 197, 198, 217, 222, 225, 232, 240, 262, 263, 266

(56) References Cited

U.S. PATENT DOCUMENTS

| | | |
|---|---|---|
| 3,153,008 A | 10/1964 | Fox |
| 3,884,882 A | 5/1975 | Caywood, Jr. |
| 4,123,436 A | 10/1978 | Holub et al. |
| 4,147,740 A | 4/1979 | Swiger et al. |
| 4,174,358 A | 11/1979 | Epstein ...................... 525/183 |
| 4,219,628 A | 8/1980 | Weemes et al. ............. 525/166 |
| 4,251,644 A | 2/1981 | Joffrion ........................ 525/64 |
| 4,279,344 A | 7/1981 | Holloway, Jr. ............... 206/631 |
| 4,346,194 A | 8/1982 | Roura .......................... 525/66 |
| 4,381,366 A | 4/1983 | Sanderson et al. |
| 4,474,927 A | 10/1984 | Novak .......................... 525/66 |
| 4,771,108 A | 9/1988 | Mackenzie .................... 525/92 |
| 4,885,340 A | 12/1989 | Hamada et al. ............. 525/183 |
| 4,960,820 A | 10/1990 | Hwo ........................... 524/528 |
| 5,013,789 A | 5/1991 | Sakuma et al. ............... 525/66 |
| 5,137,975 A | 8/1992 | Kelusky ..................... 525/263 |
| 5,147,931 A | 9/1992 | Sakuma et al. ............... 525/66 |
| 5,284,489 A | 2/1994 | Liu et al. .................... 606/228 |
| 5,290,856 A | 3/1994 | Okamoto et al. ............. 525/64 |
| 5,310,816 A | * 5/1994 | Pennington et al. ..... 525/331.5 |
| 5,534,335 A | 7/1996 | Everhart et al. ............. 428/224 |
| 5,804,304 A | 9/1998 | Williams et al. ............. 428/364 |
| 5,817,707 A | 10/1998 | DeNicola, Jr. et al. ...... 522/157 |
| 5,820,981 A | 10/1998 | Williams et al. ............. 428/364 |
| 6,319,976 B1 | 11/2001 | DeNicola, Jr. et al. ...... 524/504 |
| 6,337,373 B1 | 1/2002 | Formaro et al. ............. 525/193 |
| 6,444,722 B1 | 9/2002 | Dang et al. .................. 522/157 |

FOREIGN PATENT DOCUMENTS

| | | |
|---|---|---|
| DE | 1570353 | 4/1971 |
| EP | 0384431 | 8/1990 |
| JP | 3285936 | 3/1992 |
| JP | 3285937 | 3/1992 |

OTHER PUBLICATIONS

United States patent application Publication No. 2002/0055006 A1, Vogel et al., Publication Date: May 9, 2002, *Multilayer, Ionomeric Decorative Surfacing*.
Application Ser. No. 10/305,844 filed Nov. 27, 2002; *Irradiated, Oxidized Polymer Dispersing Agents*.
Application Ser. No. 10/305,872 filed Nov. 27, 2002; *Irradiated, Oxidized Olefin Polymer Coupling Agents*.
R. Gallucci et al., *Preparation and Reactions of EpoxyModified Polyethylene;* Journal of Applied Polymer Science; vol. 27 (425–437) 1982.
D. Lu et al., *Structure and mechanical properties of isotactic polypropylene and iPP/talc blends functionalized by electron beam irradiation;* Polymer Int.; vol. 49 (1389–1394) 2000.
R. Guan, *Structure and Morphology of Isotactic Polypropylene Functionalized by Electron Beam Irradiation;* Journal of Applied Polymer Science; vol. 76 (75–82) 2000.

\* cited by examiner

*Primary Examiner*—Nathan M. Nutter

(57) ABSTRACT

A compatible blend of an engineering thermoplastic such as a polyamide and an olefin polymer material is prepared by (1) making an oxidized olefin polymer material containing carboxylic acid groups or derivatives thereof, (2) extruding a mixture of (a) the oxidized olefin polymer material from step (1), (b) an engineering thermoplastic, (c) optionally, an inorganic base, and (d) optionally, a non-oxidized olefin polymer material, and (3) recovering a blend of the engineering thermoplastic, the oxidized olefin polymer material or an ionomer thereof, which acts as a compatibilizer, and, optionally, the non-oxidized olefin polymer material.

The oxidized olefin polymer material can be made by treating the olefin polymer material with an organic peroxide initiator while adding a controlled amount of oxygen.

22 Claims, 6 Drawing Sheets

COMPATIBILIZING AGENT FOR ENGINEERING THERMOPLASTIC/ POLYOLEFIN BLEND

FIELD OF THE INVENTION

This invention relates to a compatible blend of an engineering thermoplastic polymer and an olefin polymer material.

BACKGROUND OF THE INVENTION

Blends of two or more polymers have often been made in attempts to combine desirable properties of the individual polymers into the blend, to seek unique properties in the blend, or to produce less costly polymer products by including less expensive polymers. For example, many attempts have been made to blend polyamide resins such as nylon-6 and nylon-66, and polyolefin materials. Polyamide resins have excellent chemical and abrasion resistance, good oxygen barrier properties, good electrical properties, and superior mechanical strength, but are very sensitive to moisture and are difficult to process due to their high melting temperature. Polypropylene is a low cost, low density, semi-crystalline polymer with excellent moisture resistance that is capable of being recycled and is easy to process.

However, it is difficult to obtain a good dispersion of a polar engineering thermoplastic resin and a non-polar polyolefin resin. It is known that the addition of a graft or block copolymer of similar chemical structure to the blend components can improve the quality of the dispersion. These copolymer additives, generally referred to as compatibilizers, are often added to the blend as a third component.

Graft copolymers of alpha, beta-unsaturated carboxylic acids and anhydrides on a polypropylene backbone have often been used as compatibilizers for polypropylene/polyamide blends. Carboxylic acids and copolymers thereof, or maleic anhydride functionalized styrene/ethylene-butylene/styrene copolymers, have also been used with some success. For example, U.S. Pat. No. 5,290,856 discloses blends of polyamide, polyphenylene ether, or polyester resins with polyolefin graft copolymers such as polypropylene grafted with a styrenic polymer and a glycidyl moiety. U.S. Pat. No. 6,319,976 discloses a blend of a polyamide resin, a broad molecular weight distribution propylene polymer material, and a graft copolymer comprising a backbone of a propylene polymer material having graft polymerized thereto monomers selected from (i) at least one vinyl aromatic compound and an unsaturated carboxylic acid and (ii) at least one vinyl aromatic compound and an anhydride of an unsaturated carboxylic acid.

Ionomers of graft copolymers comprising a backbone of a polyolefin having graft polymerized thereto polymerized monomers containing acid or anhydride groups have also been used to improve adhesion between polyolefins and polar polymers such as polyamides and other engineering thermoplastics. U.S. Pat. No. 5,137,975 discloses a method for preparing a compatibilizer by contacting a molten polypropylene grafted with an unsaturated acid or anhydride with an aqueous solution of a hydroxide, carbonate or bicarbonate of an alkali metal to form an ionomer. U.S. Pat. No. 4,219,628 discloses a polyester composition containing an ethylene-propylene copolymer rubber, and an ionomer of poly(ethylene-co-acrylic acid) in which about 50% of the acrylic acid is converted to a metal salt. U.S. Pat. No. 4,885,340 describes a high impact polyamide composition comprising at least one polyamide, at least one ethylene ionomer resin, and at least one oxide or carbonate compound. U.S. Pat. No. 5,013,789 describes a process for producing a thermoplastic resin composition by adding an unsaturated carboxylic acid or a derivative thereof to a first crystalline polypropylene, a second crystalline polypropylene, and a polyamide; mixing the component with at least one hydroxide, carbonate or oxide of a metal of Groups I, II or m of the Periodic Table, and subsequently melt-mixing the mixture. U.S. Pat. No. 5,534,335 discloses a non-woven fabric made from fibers comprising at least two thermoplastic polymers, i.e., a polyamide and polypropylene, and a compatibilizer such as a zinc ionomer of an ethylene/methacrylic acid copolymer or polypropylene modified with maleic anhydride.

However, there is still a need for compatibilizers for blends of polyolefins and engineering thermoplastics that provide a good balance of properties including strength, stiffness, good gloss, and scratch and mar resistance and which when converted into film also exhibit good barrier properties.

SUMMARY OF THE INVENTION

The composition of this invention comprises:
(1) an oxidized olefin polymer material containing carboxylic acid groups or derivatives thereof, or an ionomer thereof,
(2) an engineering thermoplastic, and, optionally,
(3) a non-oxidized olefin polymer material.

A compatible blend of an olefin polymer material and an engineering thermoplastic is prepared by a process comprising:
(1) making an oxidized olefin polymer material containing carboxylic acid groups or derivatives thereof,
(2) extruding a mixture of (a) the oxidized olefin polymer material from step (1), (b) an engineering thermoplastic, (c) optionally, an inorganic base, and (d) optionally, a non-oxidized olefin polymer material, and
(3) recovering a blend of the engineering thermoplastic, the oxidized olefin polymer material or an ionomer thereof, and, optionally, the non-oxidized olefin polymer material.

In another embodiment, the compatible blend of an olefin polymer material and an engineering thermoplastic is prepared by a process comprising:
(1) making an oxidized olefin polymer material containing carboxylic acid groups or derivatives thereof,
(2) optionally, extruding a mixture of the oxidized olefin polymer material from step (1) and an inorganic base to form an ionomer of the oxidized olefin polymer material, and
(3) extruding a blend of the oxidized olefin polymer material or an ionomer thereof, an engineering thermoplastic, and, optionally, a non-oxidized olefin polymer material.

An oxidized olefin polymer material can be prepared by a process comprising:
(A) treating an olefin polymer material with 0.1% to about 4%, based on the weight of the polymer, of an organic peroxide initiator, while adding a controlled amount of oxygen so that the olefin polymer material is exposed to a first amount of oxygen of greater than 0.004% and less than 15% by volume, at a temperature of at least 25° C. but below the softening point of the olefin polymer material, (B) heating the oxidized olefin polymer material of step (A) to a second temperature of at least 25° C. but below the softening point of the olefin polymer material, in the presence of a second controlled amount of oxygen of greater than 0.004%, but less than 15% by volume, and (C) treating the oxidized olefin polymer material at a temperature of at least 80° C. but below the softening point of the polymer in an inert atmosphere to quench any active free radicals.

The oxidized olefin polymer materials and especially the ionomers thereof significantly improve the compatibility of non-oxidized olefin polymer materials and engineering thermoplastics compared to blends without the compatibilizing agent.

DETAILED DESCRIPTION OF THE INVENTION

Olefin polymer materials suitable for making the oxidized olefin polymer materials include propylene, ethylene, and butene-1 polymer materials.

When a propylene polymer material is used as the starting material for making the oxidized olefin polymer materials, the propylene polymer can be:

(1) a crystalline homopolymer of propylene having an isotactic index greater than 80, preferably about 90 to about 99.5;

(2) a crystalline, random copolymer of propylene and an olefin selected from the group consisting of ethylene and 4–10 C alpha-olefins, provided that when the olefin is ethylene, the maximum polymerized ethylene content is 10% by weight, preferably about 4%, and when the olefin is a 4–10 C alpha-olefin, the maximum polymerized content thereof is about 20% by weight, preferably about 16%, the copolymer having an isotactic index greater than 60, preferably at least 70;

(3) a crystalline, random terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;

(4) an olefin polymer composition comprising:
(a) about 10% to about 60% by weight, preferably about 15% to about 55%, of a crystalline propylene homopolymer having an isotactic index of at least 80, preferably about 90 to about 99.5, or a crystalline copolymer of monomers selected from the group consisting of (i) propylene and ethylene, (ii) propylene, ethylene and a 4–8 C alpha-olefin, and (iii) propylene and a 4–8 C alpha-olefin, the copolymer having a polymerized propylene content of more than 85% by weight, preferably about 90% to about 99%, and an isotactic index greater than 60;
(b) about 3% to about 25% by weight, preferably about 5% to about 20%, of a copolymer of ethylene and propylene or a 4–8 C alpha-olefin that is insoluble in xylene at ambient temperature; and
(c) about 10% to about 80% by weight, preferably about 15% to about 65%, of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight, preferably about 10% to about 60%, most preferably about 12% to about 55%, of polymerized ethylene and being soluble in xylene at ambient temperature and having an intrinsic viscosity, measured in decahydronaphthalene at 135° C., of about 1.5 to about 4.0 dl/g, wherein the total amount of (b) and (c), based on the total olefin polymer composition, is about 50% to about 90%, the weight ratio of (b)/(c) is less than 0.4, preferably 0.1 to 0.3, and the composition is prepared by polymerization in at least two stages and has a flexural modulus of less than 150 MPa; or (5) a thermoplastic olefin comprising:
(a) about 10% to about 60%, preferably about 20% to about 50%, of a propylene homopolymer having an isotactic index of least 80, preferably 90–99.5, or a crystalline copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 60;
(b) about 20% to about 60%, preferably about 30% to about 50%, of an amorphous copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and
(c) about 3% to about 40%, preferably about 10% to about 20%, of a copolymer of ethylene and propylene or a 4–8 C alpha-olefin that is insoluble in xylene at ambient temperature, wherein the thermoplastic olefin has a flexural modulus of greater than 150 but less than 1200 MPa, preferably about 200 to about 1100 MPa, and most preferably about 200 to about 1000 MPa.

When an ethylene polymer material is used as the starting material for the oxidized olefin polymer material, the ethylene polymer material is selected from the group consisting of (a) homopolymers of ethylene, (b) random copolymers of ethylene and an alpha-olefin selected from the group consisting of 3–10 alpha-olefins having a polymerized alpha-olefin content of about 20%, preferably about 16%, by weight, and (c) random terpolymers of ethylene and two of the 3–10 C alpha-olefins, provided that the maximum polymerized alpha-olefin content is about 20%, preferably about 16%, by weight. The 3–10 C alpha-olefins include the linear and branched alpha-olefins such as, for example, propylene, 1-butene, isobutylene, 1-pentene, 3-methyl-1-butene, 1-hexene, 3,4-dimethyl-1-butene, 1-heptene, 3-methyl-1-hexene, and 1-octene.

When the ethylene polymer is an ethylene homopolymer, it typically has a density of 0.89 g/cm$^3$ or greater, and when the ethylene polymer is an ethylene copolymer with a 3–10 C alpha-olefin, it typically has a density of 0.91 g/cm$^3$ or greater but less than 0.94 g/cm$^3$. Suitable ethylene copolymers include ethylene/butene-1, ethylene/hexene-1, ethylene/octene-1 and ethylene/4-methyl-1-pentene. The ethylene copolymer can be a high density ethylene copolymer or a short chain branched linear low density ethylene copolymer (LLDPE), and the ethylene homopolymer can be a high density polyethylene (HDPE) or a low density polyethylene (LDPE). Typically the LLDPE and LDPE have densities of 0.910 g/cm$^3$ or greater to less than 0.94 g/cm$^3$, and the HDPE and high density ethylene copolymers have densities greater than 0.940 g/cm$^3$, usually 0.95 g/cm$^3$ or greater. In general, ethylene polymer materials having a density from 0.89 to 0.97 g/cm$^3$ are suitable for use in the practice of this invention. Preferably the ethylene polymers are LLDPE and HDPE having a density from 0.89 to 0.97 g/cm$^3$.

The butene-1 polymer material used as the starting material for making an oxidized olefin polymer material is selected from normally solid, high molecular weight, predominantly crystalline homopolymer of butene-1 or a copolymer or terpolymer with a non-butene alpha-olefin in which the comonomer content is 1–15 mole %, preferably 1–10 mole %. Typically the non-butene alpha-olefin comonomer is ethylene, propylene, a $C_{5-8}$ alpha-olefin, or mixtures thereof.

The butene-1 homo- or copolymers can be isotactic or syndiotactic and have a melt flow rate from about 0.5 to 150, preferably from about 0.5 to 100, and most preferably from 0.5 to 75 g/10 min.

These butene-1 polymers, their methods of preparation, and their properties are known in the art. Additional information on polybutene-1 can be found, for example, in U.S. Pat. No. 4,960,820, the disclosure of which is incorporated herein by reference.

Suitable butene-1 polymers can be obtained, for example, by Ziegler-Natta low pressure polymerization of butene-1, e.g., by polymerizing butene-1 with catalysts of TiCl$_3$ or TiCl$_3$—AlCl$_3$ and Al(C$_2$H$_5$)$_2$Cl at temperatures of 10–100° C., preferably 20–40° C., according to the process described in DE-A-1,570,353. It can also be obtained, for example, by using TiCl$_4$—MgCl$_2$ catalysts. High melt indices are obtainable by further processing of the polymer by peroxide cracking or visbreaking, thermal treatment or irradiation to induce chain scission.

When butene-1 copolymers are used, the butene-1 copolymers preferably contain up to 15 mole % of ethylene or propylene. More preferably, the butene-1 polymer material is a homopolymer. Polybutene PB0300 homopolymer marketed by Basell USA Inc. is a particularly suitable polymer. This polymer has a melt flow of 11 g/10 min at 230° C. and 2.16 kg and a weight average molecular weight of 270,000.

Preferably, the butene-1 homopolymer has a crystallinity of at least 55% by weight measured with wide-angle X-ray diffraction after 7 days. Typically the crystallinity is less than 70%, preferably less than 60%.

In one method for making the oxidized polyolefin material, the starting polymer is irradiated under an electron beam at a dose rate of 0.1–15 megarads (Mrad) in an inert atmosphere. The irradiated polymer is then treated with oxygen at a concentration of greater than 0.004% but less than 15% by volume, preferably less than 8%, more preferably less than 5% by volume, and most preferably 1.3% to 3% by volume, at a temperature of at least 25° C. but below the softening point of the polymer, preferably about 25° C. to about 140° C., more preferably about 25° to about 100° C., and most preferably about 40° to about 80° C. In a second treatment step, the polymer is then heated to a temperature of at least 25° C. up to the softening point of the polymer (140° C. for a propylene homopolymer), preferably from 100° C. to less than the softening point of the polymer, at an oxygen concentration that is within the same range as in the first treatment step. The total reaction time is typically up to three hours. After the oxygen treatment, the polymer is treated at a temperature of at least 80° C. but below the softening point of the polymer, typically for one hour, in an inert atmosphere such as nitrogen to quench any active free radicals.

This method for making oxidized olefin polymer materials is well known. For example, the process is described in U.S. Pat. No. 5,817,707; U.S. Pat. No. 5,820,981, and U.S. Pat. No. 6,337,373, the disclosures of which are incorporated herein by reference.

In another method for making the oxidized polyolefin material, the starting polymer is treated with 0.1 to 4% of an organic peroxide initiator while adding a controlled amount of oxygen so that the olefin polymer material is exposed to greater than 0.004% but less than 15% by volume, preferably less than 8%, more preferably less than 5% by volume, and most preferably 1.3% to 3% by volume, at a temperature of at least 25° C. but below the softening point of the polymer, preferably about 25° C. to about 140° C. In a second treatment step, the polymer is then heated to a temperature of at least 25° C. up to the softening point of the polymer (140° C. for a propylene homopolymer), preferably from 100° C. to less than the softening point of the polymer, at an oxygen concentration that is within the same range as in the first treatment step. The total reaction time is typically up to three hours. After the oxygen treatment, the polymer is treated at a temperature of at least 80° C. but below the softening point of the polymer, typically for one hour, in an inert atmosphere such as nitrogen to quench any active free radicals.

Suitable organic peroxides include acyl peroxides, such as benzoyl and dibenzoyl peroxides; dialkyl and aralkyl peroxides, such as di-tert-butyl peroxide, dicumyl peroxide; cumyl butyl peroxide; 1,1,-di-tert-butylperoxy-3,5,5-trimethylcyclohexane; 2,5-dimethyl-1,2,5-tri-tert-butylperoxyhexane, and bis(alpha-tert-butylperoxy isopropylbenzene), and peroxy esters such as bis(alpha-tert-butylperoxy pivalate; tert-butylperbenzoate; 2,5-dimethylhexyl-2,5-di(perbenzoate); tert-butyl-di (perphthalate); tert-butylperoxy-2-ethylhexanoate, and 1,1-dimethyl-3-hydroxybutylperoxy-2-ethyl hexanoate, and peroxycarbonates such as di(2-ethylhexyl) peroxy dicarbonate, di(n-propyl)peroxy dicarbonate, and di(4-tert-butylcyclohexyl)peroxy dicarbonate. The peroxides can be used neat or in diluent medium, having an active concentration of from 0.1 to 6.0 pph, preferably from 0.2 to 3.0 pph. Particularly preferred is tert-butyl peroctoate as a 50 weight % dispersion in mineral oil, sold commercially under the brand name Lupersol PMS.

Regardless of the method of production, the oxidized polyolefin material contains peroxide groups and other functionalities such as carboxylic acid, ketone, ester, and lactone groups. If the oxidized product is subjected to further processing involving heating to the melt temperature, e.g., extrusion, the peroxide groups decompose but the product still contains the other oxygen-containing groups mentioned above. In addition, the number average and weight average molecular weight of the irradiated, oxidized olefin polymer are usually much lower than that of the corresponding olefin polymer starting material due to the chain scission reactions during irradiation and oxidation. In this specification, "oxidized olefin polymer material" refers to both the oxidized material containing peroxide groups and the oxidized material that contains other oxygen-containing groups but not peroxide groups.

Typically the number average molecular weight ($M_n$) of the oxidized olefin polymer materials is greater than 10,000, although it may be lower in some cases. Typically if the $M_n$ is lower than 10,000, the compatibilizer will "bloom" at the surface of the finished product.

Ionomers of the oxidized olefin polymer materials can be prepared by known methods by neutralizing some or all of the carboxylic acid groups in the polymer. This can be accomplished by neutralization by a slurry process or by neutralization in the melt. Melt neutralization is preferred. The bases used for neutralization can be oxides, hydroxides, and salts of metals of Groups IA, IIA, and IIB of the Periodic Table. These compounds include, for example, sodium hydroxide, potassium hydroxide, zinc oxide, sodium carbonate, potassium carbonate, lithium hydroxide, sodium bicarbonate, potassium hydrocarbonate, and lithium carbonate.

Component (2) of the composition of this invention is an engineering thermoplastic, which is defined as a thermoplastic resin, neat or unreinforced or unfilled, which maintains dimensional stability and most mechanical properties above 100° C. and below 0° C. This definition encompasses plastics that can be formed into functional parts that can bear loads and withstand abuse in temperature environments commonly tolerated by traditional engineering materials such as wood, metals, glass, and ceramics. Engineering thermoplastics suitable for use in the present invention include, for example, polyamides, polyesters, polycarbonates, and polyimides, all of which are commercially available.

Suitable polyamides are well known and widely available. Basically they can be obtained by polymerizing a monoamino-monocarboxylic acid or a lactam thereof having at least two carbon atoms between the amine and carboxylic acid group, or by polymerizing substantially equimolecular proportions of a diamine that contains at least two carbon atoms between the amine groups and a dicarboxylic acid; or by polymerizing a monoaminocarboxylic acid or a lactam thereof as defined above together with substantially equimolecular proportions of a diamine and dicarboxylic acid. The dicarboxylic acid may be used in the form of a functional derivative thereof, for example, an ester or acid chloride. The polyamide can also be obtained by polymerizing the salt of a diamine and a dicarboxylic acid.

The term "substantially equimolecular" proportions (of the diamine and of the dicarboxylic acid) is used to cover both strict equimolecular proportions and slight departures therefrom that are involved in conventional techniques for stabilizing the viscosity of the resulting polyamides. A monomer having a monoamine group or monocarboxylic acid group could also be added to control the molecular weight of the polyamide.

Examples of the monoamino-monocarboxylic acids or lactams thereof that are useful in preparing the polyamides include those compounds containing from 2 to 16 carbon atoms between the amino and carboxylic acid groups, the carbon atoms forming a ring with the —CO—NH— group in the case of a lactam. Particular examples of aminocarboxylic acids and lactams include, for example, 6-aminocaproic acid, butyrolactam, pivalolactam, caprolactam, capryllactam, enantholactam, undecanolactam, dodecanolactam, and 3- and 4-aminobenzoic acids.

Diamines suitable for use in the preparation of the polyamides include alkyl, aryl and alkyl-aryl diamines. Such diamines include, for example, those represented by the general formula:

where n is an integer from 2 to 16, such as trimethylenediamine, tetramethylenediamine, pentamethylenediamine, octamethylenediamine and especially hexamethylenediamine, as well as trimethylhexamethylenediamine, meta-phenylenediamine, and meta-xylylenediamine.

The dicarboxylic acids can be aromatic, for example, isophthalic and terephthalic acids, or aliphatic, wherein the aliphatic dicarboxylic acids are of the formula:

where Y represents a divalent aliphatic group containing at least 2 carbon atoms. Examples of such acids are sebacic acid, octadecanedioic acid, suberic acid, glutaric acid, pimelic acid and adipic acid. Typical examples of the polyamides or nylons, as these are often called, include, for example:

polypyrrolidone (nylon 4)
polycaprolactam (nylon 6)
polycapryllactam (nylon 8)
polyhexamethylene adipamide (nylon 6, 6)
polyundecanolactam (nylon 11)
polydodecanolactam (nylon 12)
polyhexamethylene azelaiamide (nylon 6, 9)
polyhexamethylene sebacamide (nylon 6, 10)
polyhexamethylene isophthalamide (nylon 6, I)
polyhexamethylene terephthalamide (nylon 6, T)
polyamide of hexamethylenediamine and n-dodecanedioic acid (nylon 6, 12)

as well as polyamides resulting from terephthalic acid and/or isophthalic acid and trimethylhexamethylenediamine, polyamides resulting from adipic acid and meta-xylenediamines, polyamides resulting from adipic acid, azelaic acid and 2,2-bis(p-aminocyclohexyl)propane and polyamides resulting from terephthalic acid and 4,4'-diaminodicyclohexylmethane.

Copolymers of the foregoing polyamides or prepolymers thereof are also suitable for use in the practice of the present invention. Such copolyamides include the following:

hexamethylene adipamide/caprolactam (nylon 6, 6/6)
hexamethylene adipamide/hexamethylene isophthalamide (nylon 6, 6/6, I)
hexamethylene adipamide/hexamethylene terephthalamide (nylon 6, 6/6, T)
hexamethylene adipamide/hexamethylene azelaiamide (nylon 6, 6/6, 9)
hexamethylene adipamide/hexamethylene azelaiamide/caprolactam (nylon 6, 6/6, 9/6)

Mixtures and/or copolymers of two or more of the foregoing polyamides or prepolymers thereof, respectively, are also within the scope of the present invention. Especially preferred polyamides are the polyamides 6; 6,6; 11; 12 and mixtures of at least one crystalline polyamide, e.g., 6; 6,6, and at least one amorphous polyamide, e.g., 6, I; 6, I,T; and most preferably polyamide 6, polyamide 11, or polyamide 12.

It is also understood that the use of the term "polyamides" here and in the appended claims is intended to include the toughened or supertough polyamides. Supertough polyamides, or supertough nylons, as they are more commonly known, are available commercially, e.g., from E. I. du Pont de Nemours and Company (Zytel ST resins), Wilson Fiberfille (NY resins), Badische Aniline and Sodafabrik (Ultramid resins), among others, or may be prepared in accordance with a number of U.S. patents including, among others, U.S. Pat. Nos. 4,174,358; 4,474,927; 4,346,194 and 4,251,644, which are incorporated herein by reference. These supertough nylons are prepared by blending one or more polyamides with one or more polymeric or copolymeric elastomeric toughening agents. Suitable toughening agents are disclosed in the U.S. patents identified above as well as in U.S. Pat. Nos. 3,884,882 and 4,147,740, and Galucci et al., "Preparation and Reactions of Epoxy-Modified Polyethylene," J. Appl. Poly. Sci., 27, 425–437 (1982), which are incorporated herein by reference. Typically, these elastomeric polymers and copolymers can be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

Polyesters suitable for use in the present invention are well known and widely available. They possess chain units that contain an unsubstituted or substituted aromatic ring in the polymer chain. Examples of substituents on the aromatic ring include, for example, halogen, such as chlorine or bromine, and $C_1$–$C_4$ alkyl, such as methyl, ethyl, propyl, or butyl.

Suitable polyesters can be prepared, for example, by reacting aromatic dicarboxylic acids, their esters or their ester-forming derivatives with hydroxy compounds in a conventional manner.

Examples of aromatic dicarboxylic acids are naphthalene dicarboxylic acids, terephthalic acid and isophthalic acid as well as mixtures of these. The aromatic dicarboxylic acids or their derivatives can be partly replaced, preferably in an amount of up to 10 mol %, by other dicarboxylic acids. These other dicarboxylic acids include aliphatic or cycloaliphatic dicarboxylic acids such as adipic acid, azelaic acid, sebacic acid and cyclohexane dicarboxylic acid, for example.

Preferably used dihydroxy compounds are glycols having 2 to 6 carbon atoms, in particular ethylene glycol; butane-1,4-diol; but-2-ene-1,4-diol; hexane-1,6-diol; hexane-1,4-diol; cyclohexane-1,4-diol; 1,4-di-(hydroxymethyl)-cyclohexane; 2,2-di-(4"-hydroxyphenyl)-propane, and neopentyl glycol or mixtures of these.

Preferred polyesters are polyalkylene terephthalates, which are derived from alkanediols having 2–6 carbon atoms. Polyethylene terephthalate and polybutylene terephthalate are particularly preferred. The relative viscosity of the polyesters is in general from 1.2 to 1.8, measured in a 0.5% strength by weight solution in a phenol/o-dichlorobenzene mixture (weight ratio 3:2) at 25° C.

Suitable polycarbonates include aromatic polycarbonates, which are well known in the art and are commercially available. These polycarbonates can be prepared by a variety of conventional and well known processes, which include transesterification, melt polymerization, and interfacial polymerization. The polycarbonates are generally prepared by reacting a dihydric phenol with a carbonate precursor such as, for example, phosgene. Suitable processes for preparing the polycarbonates of the present invention are described in, for example, U.S. Pat Nos. 4,123,436 and 3,153,008. However, other known processes for producing polycarbonates are suitable. Particularly preferred polycarbonates are aromatic polycarbonates prepared by reacting bisphenol-A [2,2-bis(4-hydroxyphenyl)phenyl)propane] with phosgene.

The engineering thermoplastic can be present as either a continuous or dispersed phase, depending on the properties desired in the final product made from the composition. When the engineering thermoplastic is the continuous phase, the properties of the composition are more like those of the engineering thermoplastic. When the olefin polymer material is the continuous phase, the properties of the composition are more like those of the olefin polymer material.

The composition can also contain an optional third component, a non-oxidized propylene polymer material. Suitable non-oxidized olefin polymer materials include the polyolefin materials listed previously as suitable as the starting materials for the oxidized olefin polymer materials. Preferably, the non-oxidized polyolefin and the starting material for the oxidized olefin polymer material are a propylene homopolymer having an isotactic index greater than 80.

The composition can have three components consisting of a non-oxidized olefin polymer, the engineering thermoplastic, and the oxidized olefin polymer material or an ionomer thereof as a compatibilizing agent. The composition can also consist of two components, the oxidized propylene polymer material or an ionomer thereof and the engineering thermoplastic. Whether a two component or a three component composition is chosen depends upon the properties desired in the final product.

Optionally, the composition can also contain about 2% to about 40%, preferably about 5% to about 30%, based on the total weight of the composition, of one or more rubber components. The rubber component is selected from one or more of the group consisting of (i) an olefin copolymer rubber, (ii) a monoalkenyl aromatic hydrocarbon-conjugated diene block copolymer, and (iii) a core-shell rubber. Any of these rubber components can have acid or anhydride functionality or can be free of these functional groups. The preferred rubber components are (i) or (ii), either alone or in combination.

Suitable olefin copolymer rubbers include, for example, saturated olefin copolymer rubbers such as ethylene/propylene monomer rubbers (EPM), ethylene/octene-1, and ethylene/butene-1 rubbers, and unsaturated olefin copolymer rubbers such as ethylene/propylene/diene monomer rubbers (EPDM). The preferred olefin copolymer rubbers are ethylene/propylene, ethylene/butene-1, and ethylene/octene-1 copolymers.

The monoalkenyl aromatic hydrocarbon-conjugated diene block copolymer can be a thermoplastic elastomer of the A-B (or diblock) structure, the linear A-B-A (or triblock) structure, the radial $(A-B)_n$ type where n=3–20%, or a combination of these structure types, wherein each A block is a monoalkenyl aromatic hydrocarbon polymer block, and each B block is an unsaturated rubber block. Various grades of copolymers of this type are commercially available. The grades differ in structure, molecular weight of the mid and end blocks, and the ratio of monoalkenyl aromatic hydrocarbon to rubber. The block copolymer can also be hydrogenated. Typical monoalkenyl aromatic hydrocarbon monomers are styrene, ring-substituted 1–4 carbon linear or branched alkyl styrenes, and vinyltoluene. Styrene is preferred. Suitable conjugated dienes include, for example, butadiene and isoprene. Preferred block copolymers are hydrogenated styrene/ethylene-butene-1/styrene triblock copolymers.

The weight average molecular weight ($M_w$) of the block copolymers generally will be in the range of about 45,000 to about 260,000 g/mole, average molecular weights in the range of about 50,000 to about 125,000 g/mole being preferred on the basis that they produce compositions having the best balance of impact strength and stiffness. Also, while block copolymers having unsaturated as well as saturated rubber blocks can be used, copolymers having saturated rubber blocks are preferred, also on the basis of the impact/stiffness balance of the compositions containing them. The weight ratio of monoalkenyl aromatic hydrocarbon to conjugated diene rubber in the block copolymer is in the range of about 5/95 to about 50/50, preferably about 10/90 to about 40/60.

The core-shell rubber components comprise small particles of a crosslinked rubber phase surrounded by a compatibilizing shell, normally a glassy polymer or copolymer. The core is typically a diene rubber such as butadiene or isoprene rubber, or a polyacrylate. The shell is typically a polymer of two or more monomers selected from styrene, methyl methacrylate, and acrylonitrile. Particularly preferred core-shell rubbers have a polyacrylate core.

Suitable rubbers useful as impact modifiers include, for example, Engage 8150 ethylene/octene-1 copolymer commercially available from DuPont-Dow Elastomers; EPM 306P ethylene/propylene copolymer, commercially available from the Polysar Rubber Division of Miles, Incorporated; and Kraton RP6912 styrene/ethylene-propylene/styrene triblock copolymer rubber and Kraton FG1910X styrene/ethylene-butene-1/styrene triblock copolymer rubber modified with maleic anhydride, commercially available from Shell Chemical Company.

Other additives such as pigments, slip agents, waxes, oils, antiblocking agents, and antioxidants can also be present in the composition.

One method for making a compatible blend of an olefin polymer material and an engineering thermoplastic comprises:

(1) making an oxidized olefin polymer material containing carboxylic acid groups or derivatives thereof,
(2) extruding a mixture of (a) the oxidized olefin polymer material from step (1), (b) an engineering thermoplastic, (c) optionally, an inorganic base, and (d) optionally, a non-oxidized olefin polymer material, and
(3) recovering a blend of the engineering thermoplastic, the oxidized olefin polymer material or an ionomer thereof, and, optionally, the non-oxidized olefin polymer material.

In step (2), the optional inorganic base is added only if an ionomer of the oxidized olefin polymer material is desired. The optional non-oxidized olefin polymer material is added in the case where a three component composition is desired. In this embodiment of the process, the ionomer can be formed and the other components of the composition can be addded all in one step.

In another embodiment, a compatible blend of an olefin polymer material and an engineering thermoplastic is prepared by a process comprising:

(1) making an oxidized olefin polymer material containing carboxylic acid groups or derivatives thereof,
(2) optionally, extruding a mixture of the oxidized olefin polymer material from step (1) and an inorganic base to form an ionomer of the oxidized olefin polymer material, and
(3) extruding a blend of the oxidized olefin polymer material or an ionomer thereof, the engineering thermoplastic, and, optionally, a non-oxidized olefin polymer material.

Optional step (2) is included in the process only if an ionomer of the oxidized olefin polymer material is desired. If one wishes to use the oxidized olefin polymer material without neutralizing the carboxylic acid groups that are present, step (2) can be omitted. In step (3), the optional non-oxidized olefin polymer material can be omitted if a two component composition is desired. The ionomer is formed separately and then added to the other components as opposed to adding all of the components at one time, when only a small amount of the oxidized olefin polymer material is used. This ensures that the reaction between the base and the carboxylic acid groups on the oxidized olefin polymer material will take place efficiently.

The test methods used in the following examples include:
Notched Izod impact, Procedure A,
  using a 2 ft-lb pendulum ASTM D-256
Tensile strength, test speed at 2"/min ASTM-D 638-89
Elongation ASTM D-638-89
Flexural strength, test speed at 0.05"/min ASTM D-790-92
Flexural modulus ASTM D-790-92
MFR @ 230° C., 3.8 kg or 2.16 kg ASTM D-1238
HDT at 66 psi and 264 psi
  using 1/8" thick flex bars ASTM D-648
Rockwell R Hardness ASTM D-785

Isotactic index is defined as the % insoluble in xylene at 25° C. The weight percent of olefin polymer soluble in xylene at room temperature is determined by dissolving 2.5 g of the polymer in 250 ml of xylene at room temperature in a vessel equipped with a stirrer, that is heated at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

Intrinsic viscosity is measured in decahydronaphthalene at 135° C.

Injection molded tensile bars were used for scanning electron microscopy (SEM). Samples were fractured in liquid nitrogen, and observations were made using the scanning electron microscope Phillips 515. Micrographs were taken in several areas including the center of the tensile bar, perpendicular to the direction of flow, and the area near the skin.

In this specification, all parts and percentages are by weight unless otherwise noted.

EXAMPLE 1

This example shows the mechanical properties of a blend of a non-oxidized polypropylene, a polycarbonate, and either an oxidized polypropylene or an ionomer of an oxidized polypropylene as the compatibilizer. The polycarbonate is the dispersed phase.

The starting material for making oxidized polypropylene (OPP) #1 was a crystalline homopolymer of propylene (PP #1) having a melt flow rate (MFR) of 0.4 g/10 min @ 230° C./2.16 kg, and xylene insolubles of 95.4%, commercially available from Basell USA Inc. OPP #1 was prepared by irradiating the propylene homopolymer with an electron beam at a dose of 0.5 Mrad, treating with 3 mol % oxygen at 140° C. for 60 minutes, holding for 60 minutes at the same temperature in the absence of oxygen, and then cooling. This oxidized polypropylene contained carboxylic acid functionality. The MFR before making the ionomer was 2500 dg/min at 230° C. and 2.16 kg.

The starting material for making OPP #2 was a crystalline propylene homopolymer (PP #2) having a MFR of 9 g/10 min at 230° C./2.16 kg, and xylene insolubles of 96.5%, commercially available from Basell USA Inc. OPP #2 was prepared by irradiating the propylene homopolymer at 0.5 Mrad with an electron beam, treating with 1.45 mol % oxygen at 140° C. for 60 minutes, holding at 140° C. in the absence of oxygen for another 60 minutes, and cooling. This oxidized polypropylene contained carboxylic acid functionality. The MFR before making the ionomer was 325 dg/min at 230° C. and 2.16 kg.

An ionomer was prepared from the oxidized polypropylene having a MFR of 2500 dg/min (OPP #1) by reactive extrusion in a co-rotating intermeshing Leistritz LSM 34 GL twin-screw extruder (8 zone plus a die, L/D ~30) with a 3 VM screw, using zinc oxide as the base (1 part per hundred parts of the polymer composition). The extrusion conditions were 250 rpm and a throughput of 25 lb/hr, with vacuum to remove any by-products. The oxidized PP and its ionomer were used without the need for drying.

The polycarbonate (PC) used in the blend was Calibre 302-22 polycarbonate (MFR=23) commercially available from Dow Chemical Company. It was dried in a desiccant drying oven at 80° C. for 2–3 hours prior to blending.

The non-oxidized PP was a broad molecular weight distribution propylene homopolymer (BMWD PP) having $M_w/M_n=4.9$ and a MFR<1, commercially available from Basell USA Inc.

All materials were simultaneously dry-blended and bag mixed with Irganox B225. antioxidant and calcium stearate. Irganox B225 antioxidant is a 1:1 blend of Irganox 1010 antioxidant and Irgafos 168 tris(2,4-di-t-butylphenyl) phosphite anitoxidant and is commercially available from Ciba Specialty Chemicals Corporation. The composition of each sample is shown in Table 1. The amounts given for the stabilizers are in parts per hundred parts of the polymer composition.

Compounding was performed in the Leistritz twin screw extruder described previously. The extrusion temperature was 240° C. for all zones. The actual melt temperature was approximately 245–250° C., the throughput was 25 lb/hr, and the speed was 300 RPM. All materials were molded on a 5 oz Battenfeld injection molding machine at a mold temperature of 70° C.

Tensile bars were conditioned for approximately 48 hours in 50% relative humidity and at 23° C. All properties were measured at room temperature. The results of the measurements are given in Table 1. In Table 1, NY=no yield.

TABLE 1

| Composition, Wt. % | Comparative Sample 1 | Sample 1 | Sample 2 | Sample 3 |
|---|---|---|---|---|
| OPP #1, ZnO ionomer, MFR = 2500 | | | 20 | |
| OPP #1, MFR = 2500 | | 20 | | |
| OPP #2, MFR = 325 | | | | 20 |
| BMWD PP | 70 | 50 | 50 | 50 |
| Polycarbonate, MFR = 23 | 30 | 30 | 30 | 30 |
| Irganox B-225 antioxidant (pph) | 0.2 | 0.2 | 0.2 | 0.2 |
| Calcium stearate (pph) | 0.1 | 0.1 | 0.1 | 0.1 |
| Notched Izod impact (ft.lb/in) | 0.6 | 0.2 | 0.2 | 0.4 |
| Tensile strength @ yield (psi) | 5948 | 4702 | 5769 | 5592 |
| Tensile strength @ break (psi) | 5358 | 4702 | 5782 | 5120 |
| Elongation @ yield (%) | 5 | NY | 4 | 5 |
| Elongation @ break (%) | 12 | 3 | 4 | 12 |
| Flexural strength @ yield, 0.05"/min (psi) | 9050 | 8715 | 9448 | 9097 |
| Flexural modulus, 1% secant (Kpsi) | 277 | 277 | 278 | 276 |
| MFR @ 230° C., 3.8 kg (dg/min) | 9.5 | 59 | 78 | 40 |
| HDT, ⅛", 264 psi (° C.) | 95 | 85 | 93 | 92 |
| HDT, ⅛", 66 psi (° C.) | 133 | 125 | 122 | 131 |
| Rockwell R hardness | 96 | 99 | 101 | 98 |

Sample 3 in Table 1 shows properties comparable with the control PP/PC blend (Comparative Sample 1) with a four-fold increase in the MFR, while Sample 1 shows reduction in properties also with significant MFR increases (nearly 6 fold). Comparisons of Sample 1 and Sample 2 (ionomer) show significant increases in properties even with high MFR ionomer. This indicates that the ionomer is a better compatibilizer than oxidized PP.

While the physical properties of the examples in Table 1 were marginally different as compared to the control incompatible blend (Comparative Sample 1), there were significant changes in the morphology. Without adding oxidized PP as a compatibilizer, the blend showed poor dispersion of the PC dispersed phase. Irregular size and shape and incomplete break-up of PC domains were observed throughout. The addition of oxidized PP to the blend produced better compatibility. More regular, smaller and spherical shape of the PC with occasionally a few domains not completely broken up were seen. The Zn++ ionomer sample made from the oxidized PP with 2500 MFR shows the best morphology. PC domains are small and spherical throughout the sample. There was also less PC debonded from the continuous phase, which indicated more interfacial adhesion.

EXAMPLE 2

This example shows the mechanical properties of a blend of PP/oxidized PP/Nylon-6 polyamide compared with control blends that contained no compatibilizer.

OPP #1, OPP #2, and the ZnO ionomer of OPP #1 were prepared as described in Example 1. The $Na_2CO_3$ ionomer of OPP #1 was prepared in the same manner as the ZnO ionomer, except that 1 part $Na_2CO_3$ per hundred parts of the polymer composition was used as the base instead of ZnO.

The BMWD PP was the same as in Example 1. PP #3 was a crystalline propylene homopolymer having a MFR=400 g/10 min, and xylene insolubles of 97.5%, commercially available from Basell USA Inc.

The polyamide was Capron 8202NL polyamide (Nylon-6), which had a formic acid viscosity of 50, MFR of 66 g/10 min @ 2.16 kg and 230° C., $NH_2-$ end group=62 meq/g COO— end group=62 meg/g, and is commercially available from Honeywell. The polyamide was dried in a desiccant drying oven at 80° C. for two to three hours prior to blending.

The materials were blended and compounded and tensile bars were prepared for measurement as described in Example 1. The results of the measurements are given in Table 2.

TABLE 2

| Composition, Wt. % | Comp. Sample 1 | Sample 1 | Sample 2 | Sample 3 | Comp. Sample 2 |
|---|---|---|---|---|---|
| OPP #1, Na$_2$CO$_3$ ionomer, MFR = 2500 | | | | 10 | |
| OPP #1, ZnO ionomer, MFR = 2500 | | | 10 | | |
| OPP #2, MFR = 325 | | 20 | | | |
| PP #3, MFR = 400 | | | | | 20 |
| BMWD PP | 75 | 55 | 65 | 65 | 55 |
| Polyamide | 25 | 25 | 25 | 25 | 25 |
| Irganox B-225 antioxidant (pph) | 0.2 | 0.2 | 0.2 | 0.2 | 0.2 |
| Calcium stearate (pph) | 0.1 | 0.1 | 0.1 | 0.1 | 0.1 |
| Notched Izod impact (ft.lb/in) | 1.5 | 0.3 | 0.4 | 0.3 | 0.4 |
| Tensile strength @ yield (psi) | 4573 | 5781 | 5803 | 6089 | 5205 |
| Tensile strength @ break (psi) | 4453 | 5071 | 5518 | 5772 | 4952 |
| Elongation @ yield w/extensometer (%) | 4 | 4 | 4 | 4 | 4 |
| Elongation @ break w/extensometer (%) | 5 | 8 | 6 | 7 | 8 |
| Flexural strength @ yield, 0.05" (psi) | 7675 | 9046 | 9253 | 9450 | 7679 |
| Flexural modulus, 1% secant (Kpsi) | 259 | 274 | 279 | 286 | 242 |
| MFR @ 230° C., 3.8 kg (dg/min) | 16 | 34 | 33 | 26 | 28 |

Samples 2 and 3 containing an ionomer of an oxidized PP having a MFR of 2500 showed significant mechanical property improvement compared to Comparative Samples 1 and 2. They were also better compared to oxidized PP as a compatilibilizer (Sample 1).

The morphology of the samples explained the improvement in mechanical properties as well as the compatibility. The incompatible PP/nylon blend showed large, irregular size and shape of nylon domains. The blend using OPP #1 and especially the blend using the Na+ ionomer of OPP #1 as a compatibizer, showed a fine, spherical and uniform dispersion of the nylon phase.

EXAMPLE 3

This example shows the use of an oxidized PP or an ionomer thereof in a two component blend with nylon-6 polyamide, where the polyamide was the dispersed phase and the OPP or its ionomer was the continuous phase.

The nylon-6 polyamide was the same as in Example 2. The starting material for OPP #4 was a crystalline homopolymer (PP #4) having a MFR=0.4 g/10 min and xylene insolubles of 95.4%, commercially available from Basell USA Inc. Oxidized PP #4 was prepared in the same manner as OPP #1 in Example 1, except that 0.8% by vol oxygen was used. The Na+ ionomer thereof was prepared by the same method as in Example 1, except that 1 part Na$_2$CO$_3$ per hundred parts of the polymer composition was used as the base instead of ZnO. The non-oxidized propylene homopolymer was PP #4, described previously.

The materials were blended and compounded and tensile bars were prepared for testing as described in Example 1. The results of the measurements are given in Table 3.

TABLE 3

| Composition (Wt. %) | Sample 1 | Sample 2 | Comp. Sample 1 |
|---|---|---|---|
| Polyamide, MFI = 34.2 (3.8 kg, 230° C.) | 40 | 40 | 40 |
| OPP #4, MFR = 2.5 | 60 | | |
| OPP #4, Na+ ionomer | | 60 | |
| PP #4, MFR = 4 | | | 60 |
| Irganox B-225 antioxidant (pph) | 0.2 | 0.2 | 0.2 |
| Calcium stearate (pph) | 0.1 | 0.1 | 0.1 |
| Notched Izod impact @ 23° C. (ft.lb/in) | 1.2 | 1.7 | 1.5 |
| Tensile strength @ yield, 2"/min (psi) | 5827 | 5997 | 4804 |
| Tensile strength @ break, single gate (psi) | 5459 | 5451 | 4599 |
| Elongation @ yield (%) | 5 | 5 | 4 |
| Elongation @ break (%) | 10 | 13 | 5 |
| Flexural strength @ yield, @ 0.05"/min (psi) | 7688 | 7931 | 6672 |
| Flexural modulus @ 0.05"/min, 1% secant (Kpsi) | 204 | 210 | 197 |
| MFR @ 230° C., 3.8 kg (g/10 min) | 58 | 48 | 64 |

Samples 1 and 2 had better mechanical properties than the incompatible control blend of nylon-6 polyamide and the non-oxidized propylene homopolymer. The blend containing the ionomer of the oxidized PP showed better properties than the blend containing the oxidized PP. The blends containing oxidized PP or its ionomer had better stiffness and strength than the control blend without either of these polymers.

EXAMPLE 4

This example compares the physical properties of a blend of nylon-6 polyamide and an oxidized heterophasic propylene polymer with a blend of nylon-6 polyamide and a non-oxidized heterophasic material.

The nylon-6 polyamide was the same as the one used in Example 2, and had a MFI=34.2 at 3.8 kg and 230° C. The heterophasic propylene polymer material consisted of (a) 33% propylene-ethylene random copolymer having an ethylene content of 3.3% and an isotactic index, defined as the xylene insoluble fraction, of 94, (b) 8.3% semi-crystalline ethylene-propylene copolymer fraction containing ~83% ethylene, and (c) 58.7% amorphous ethylene-propylene copolymer fraction containing ~22% ethylene, commercially available from Basell USA Inc. The oxidized propylene polymer was prepared by heating the material in the presence of 1 pph of Lupersol PMS (50% t-butylperoxy-2-ethylhexanoate in odorless mineral spirits), commercially available from ELF Atochem, and 1 mole % oxygen at a temperature of 120° C. for one hour. The polymer was then heated in the absence of oxygen at a temperature of 120° C. for one hour to quench all unreacted radicals.

The materials were blended and compounded and tensile bars were prepared for testing as described in Example 1. The results of the measurements are given in Table 4. In Table 4, PB stands for partial break and NB stands for no break.

TABLE 4

| Composition (Wt. %) | Comp. Sample 1 | Sample 1 |
|---|---|---|
| Polyamide, MFI = 34.2 (3.8 kg, 230° C.) | 40 | 40 |
| Propylene heterophasic material, MFR = 13 (3.8 kg, 230° C.) | 60 | — |
| OPP #5, MFR = 13 @ 3.8 kg, 230° C.) | — | 60 |
| Notched Izod impact @ 23° C. (ft.lb/in) | 2.7 | NB |
| Mode of break | PB | NB |
| Tensile strength @ yield, 2"/min (psi) | 2250 | 3092 |
| Elongation @ yield (%) | 10 | 21 |
| Elongation @ break (%) | 13 | 69 |
| Flexural strength @ yield, @ 0.05"/min (psi) | 2288 | 2957 |
| Flexural modulus @ 0.05"/min, 1% secant (Kpsi) | 55 | 74 |
| MFR @ 230° C., 3.8 kg | 25 | 32 |

Sample 1 that contained the oxidized heterophasic propylene polymer material and nylon-6 polyamide had excellent impact and better strength and stiffness as compared to the comparative sample that contained the non-oxidized heterophasic material. This clearly shows that the acid, ester, and lactone functionalities in the oxidized heterophasic material provided the compatibility for the polypropylene and polyamide phases.

EXAMPLE 5

This example describes the preparation of an ionomer of oxidized polyethylene.

An ethylene polymer having a MFR of 2.1 g/10 min at 190° C. and 2.16 kg was irradiated at 1.0 Mrad. The irradiated polymer was treated wth 5.0% by vol of oxygen at ambient temperature for 60 minutes. The polymer was further treated with 5% oxygen at 110° C. for 60 minutes. Oxygen was then removed. The polymer was heated at 110° C. in the absence of oxygen for 60 min, cooled and collected. MFR @ 190° C. and 2.16 kg=7.9 g/10 min.

The oxidized polyethylene (100 pph), Na$_2$CO$_3$ (1 pph), B225 anntioxidant (0.2 pph) and calcium stearate (0.1 pph) were dry blended and extruded on the Leistritz twin screw extruder described in Example 1 under the following conditions: 300° F. for all zones, 3 VM screw, 25 lb/hr, and 200 rpm. The sample was then dried in an oven at 80° C. for two hours, cooled and collected.

EXAMPLE 6

This example describes the preparation of an ionomer of oxidized polybutene-1.

A butene-1 homopolymer with a MFR of 11 g/10 min at 230° C. and 2.16 kg was irradiated at 1.0 Mrad. The irradiated polymer was treated with 5.0% oxygen by volume at ambient temperature for 60 minutes. The polymer was further treated with 5% oxygen by volume at 95° C. for 180 min. Oxygen was removed. The polymer was heated at 95° C. in the absence of oxygen for 180 minutes, then cooled an collected. MFR @ 230° C. and 2.16 kg=22.9 g/10 min.

The oxidized polybutene-1 (100 pph), Na$_2$CO$_3$ (1 pph), B225 antioxidant (0.2 pph), and calcium stearate (0.1 pph) were dry blended and extruded on the Leistritz twin screw extruder described in Example 1 under the same conditions as in Example 5. The sample was then dried in an oven at 80° C. for two hours, cooled, and collected.

EXAMPLE 7

This example illustrates the use of an oxidized propylene homopolymer or its Na+ or K+ ionomer in a blend with nylon-6 polyamide, where the polyamide was the continuous phase.

The nylon-6 polyamide is the same as in Example 2. The starting material for making OPP #3 was described in Example 2 (PP #3). OPP #3 was prepared by irradiating a propylene homopolymer having a MFR of 0.7 g/10 min and an isotactic index of 95.6, commercially available from Basell USA Inc., at a rate of 0.5 Mrad under a blanket of nitrogen. The irradiated polymer was then treated with 2.5% by volume of oxygen at 55° C. for 5 minutes and then with 2.5% by volume of oxygen at 140° C. for an additional 60 minutes. The oxygen was then removed. The polymer was then heated at 140° C. under a blanket of nitrogen for 60 minutes, cooled and collected. This oxidized polypropylene contained carboxylic acid functionality. The MFR before making the ionomer was 1300 g/10 min and the peroxide concentration was 28 mmol/kg of polymer.

Ionomers were prepared from OPP #3 as described in Example 1, except that 0.25 part Na$_2$CO$_3$ and 0.25 part K$_2$CO$_3$ per hundred parts of the polymer composition were used as the base for Samples 2 and 3, respectively.

The materials were blended and compounded and tensile bars were prepared for testing as described in Example 1. The results of the measurements are given in Table 5.

TABLE 5

| Composition (Wt. %) | Comp. Sample 1 | Sample 1 | Sample 2 (Na Ionomer) | Sample 3 (K Ionomer) |
|---|---|---|---|---|
| Polyamide, MFI = 34.2 (3.8 kg, 230° C.) (g/10 min) | 75 | 75 | 75 | 75 |
| PP #3, MFR = 400 (g/10 min) | 25 | — | — | — |
| OPP #3, MFR = 1300 (g/10 min) | — | 25 | 25 | 25 |
| B225 antioxidant (pph) | 0.2 | 0.2 | 0.2 | 0.2 |
| Calcium stearate (pph) | 0.1 | 0.1 | 0.1 | 0.1 |
| Base (pph) | | | Na$_2$CO$_3$ 0.25 | K$_2$CO$_3$ 0.25 |
| Tensile strength @ yield, 2"/min (psi) | 6117 | 6688 | 6880 | 6620 |
| Tensile strength @ break (psi) | 5788 | 6688 | 6880 | 6606 |
| Flexural strength @ yield, 0.05"/min (psi) | 8356 | 10090 | 9753 | 10090 |
| Flexural modulus @ 0.05"/min, 1% secant (Kpsi) | 283 | 295 | 273 | 294 |
| MFR @ 230° C., 3.8 kg (g/10 min) | 49 | 61 | 62 | 54 |
| Appearance | Delamination | Dull | Glossy | Glossy |

Samples 1–3 that contained the oxidized propylene polymer material or an ionomer thereof had better strength and stiffness as compared to the comparative sample that contained the non-oxidized propylene polymer material.

Figure 1:
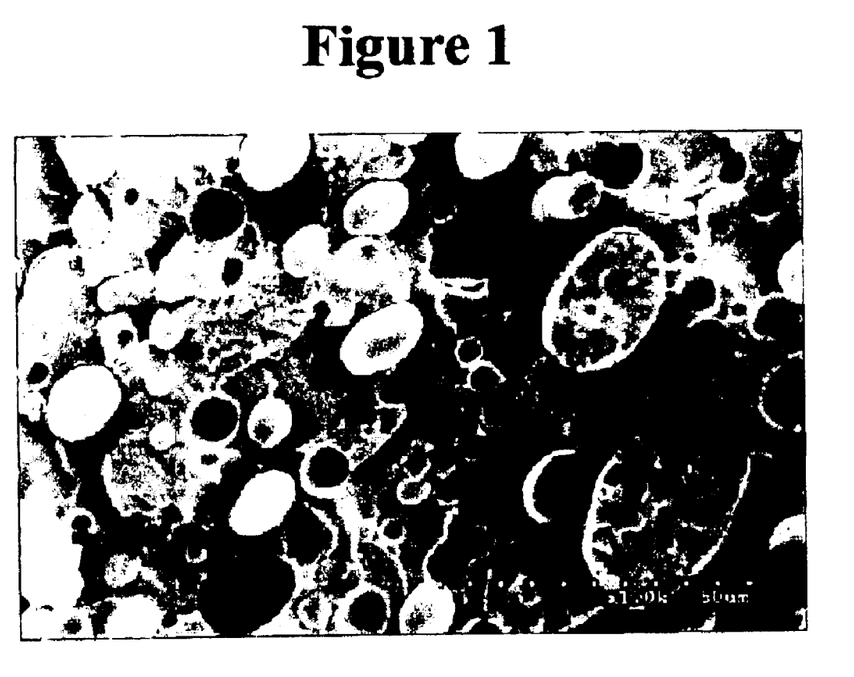
FIG. 1 is a photomicrograph of a 75/25 blend of nylon-6 polyamide and a propylene homopolymer.
Figure 2:
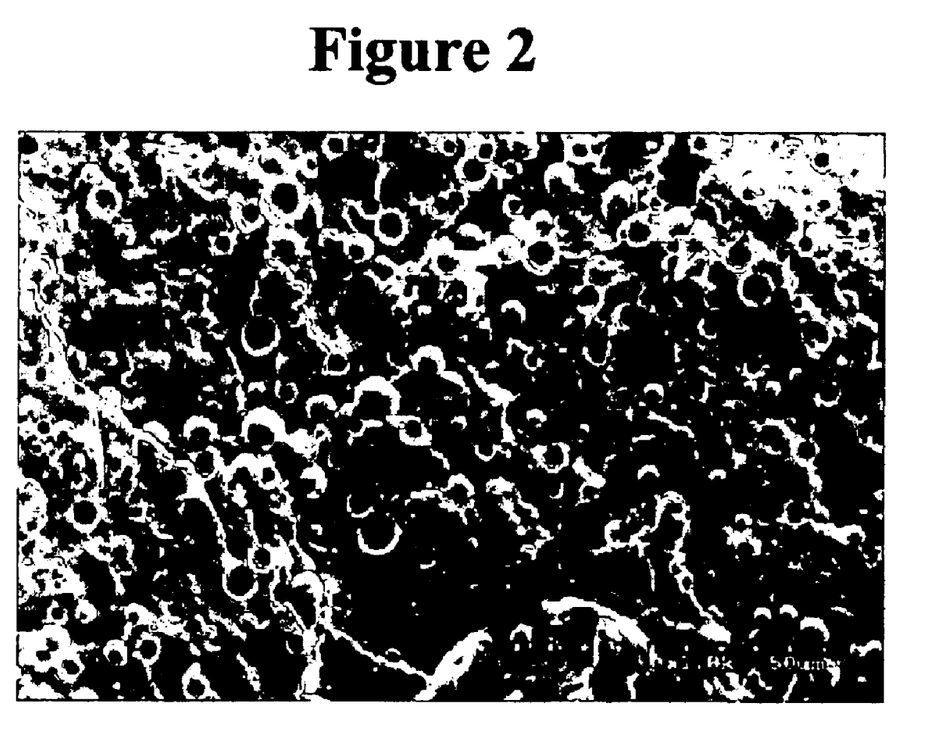
FIG. 2 is a photomicrograph of a 75/25 blend of nylon-6 polyamide and an oxidized propylene homopolymer.
Figure 3:
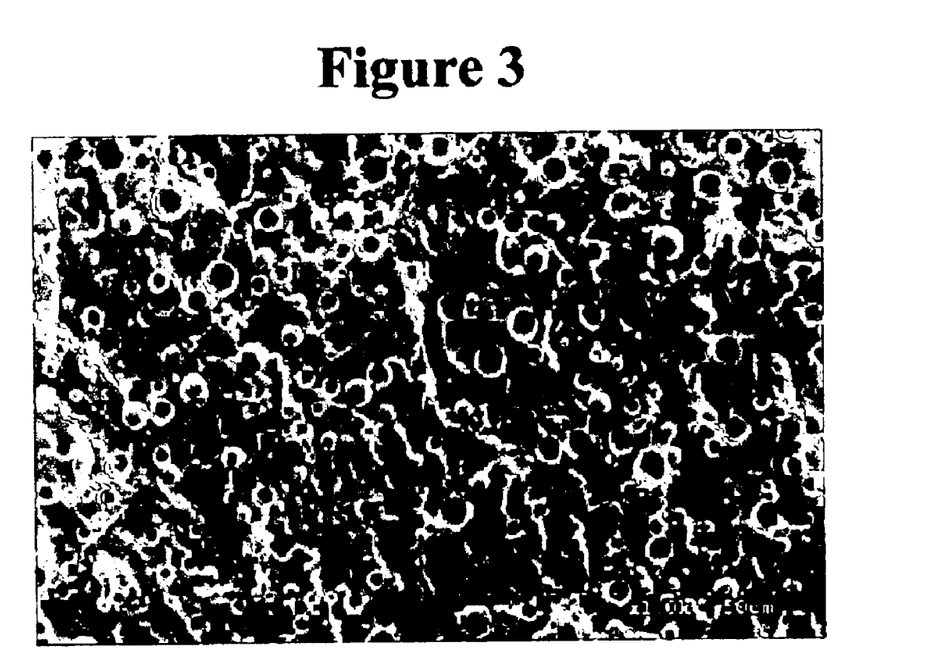
FIG. 3 is a photomicrograph of a 75/25 blend of nylon-6 and a sodium ionomer of an oxidized propylene homopolymer.

The morphology of Comparative Sample 1, Sample 1, and Sample 2 can be seen in FIGS. 1, 2, and 3, respectively. FIG. 1 shows the morphology of an incompatible blend, where polypropylene was the dispersed phase. Large non-spherical domains were seen, indicating poor dispersion. In FIG. 2, oxidized polypropylene replaced non-oxidized polypropylene. A more compatible blend was obtained, and the dispersed domain became spherical. Similarly, a well dispersed and compatible blend was obtained when the sodium ionomer of the oxidized polypropylene was used (FIG. 3).

EXAMPLE 8

This example shows the mechanical properties of a blend of PP/oxidized PP/polyester compared with control blends that contained no compatilibizer. The oxidized PP or an ionomer thereof was the dispersed phase.

The starting material for making OPP #3 was the crystalline propylene homopolymer (PP #3) described in Example 2. OPP #3 was prepared as described in Example 7.

The polyester was Valox 325 polybutylene terephthalate (PBT), commercially available from GE Polymer Land.

The ionomers were prepared as described in Example 1, except that $Na_2CO_3$ and $K_2CO_3$ were used as the base instead of zinc oxide.

The materials were blended and compounded and tensile bars were prepared for measurement as described in Example 1. The results of the measurements are given in Table 6.

TABLE 6

| Composition (Wt. %) | Comparative Sample 1 | Sample 1 | Sample 2 | Sample 3 |
|---|---|---|---|---|
| PBT | 90 | 90 | 90 | 27 |
| PP #3, MFR = 400 g/10 min | 10 | — | — | — |
| OPP #3, MFR = 1300 g/10 min | — | 10 | 10 | 10 |
| $Na_2CO_3$ (pph) | — | — | 0.1 | — |
| $K_2CO_3$ (pph) | — | — | — | 0.1 |
| B225 antioxidant (pph) | 0.2 | 0.2 | 0.2 | 0.2 |
| Calcium stearate (pph) | 0.1 | 0.1 | 0.1 | 0.1 |
| Tensile strength @ yield, 2"/min (psi) | 7239 | 7196 | 7191 | 7220 |
| Tensile strength @ break (psi) | 6090 | 6026 | 6440 | 6331 |
| Flexural strength @ yield, 0.05"/min (psi) | 11850 | 11700 | 11720 | 11770 |
| Flexural modulus @ 0.05"/min, 1% secant (Kpsi) | 363 | 352 | 315 | 350 |
| MFR @ 230° C., 3.8 kg (g/10 min) | 20 | 17 | 21 | 25 |

Figure 4:
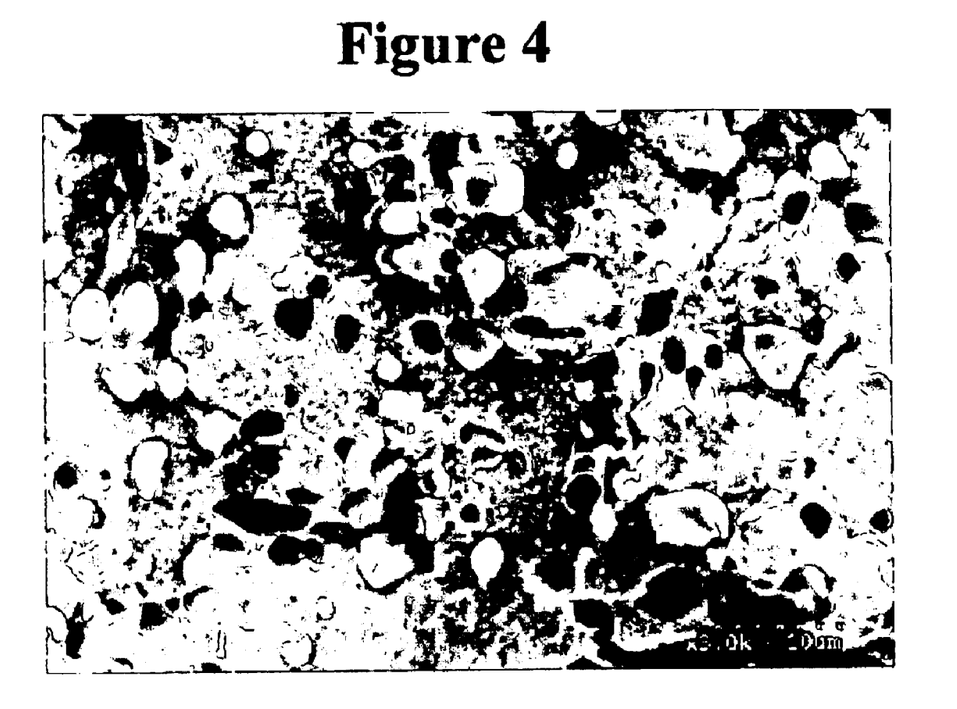
FIG. 4 is a photomicrograph of a 90/10 blend of polybutylene terephthalate and a propylene homopolymer.
Figure 5:
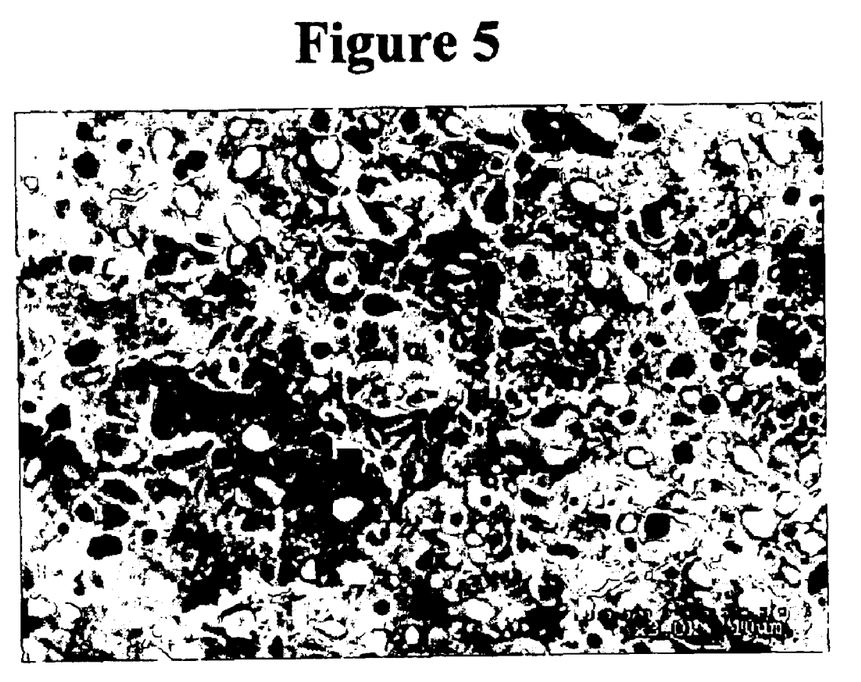
FIG. 5 is a photomicrograph of a 90/10 blend of polybutylene terephthalate and an oxidized propylene homopolymer.
Figure 6:
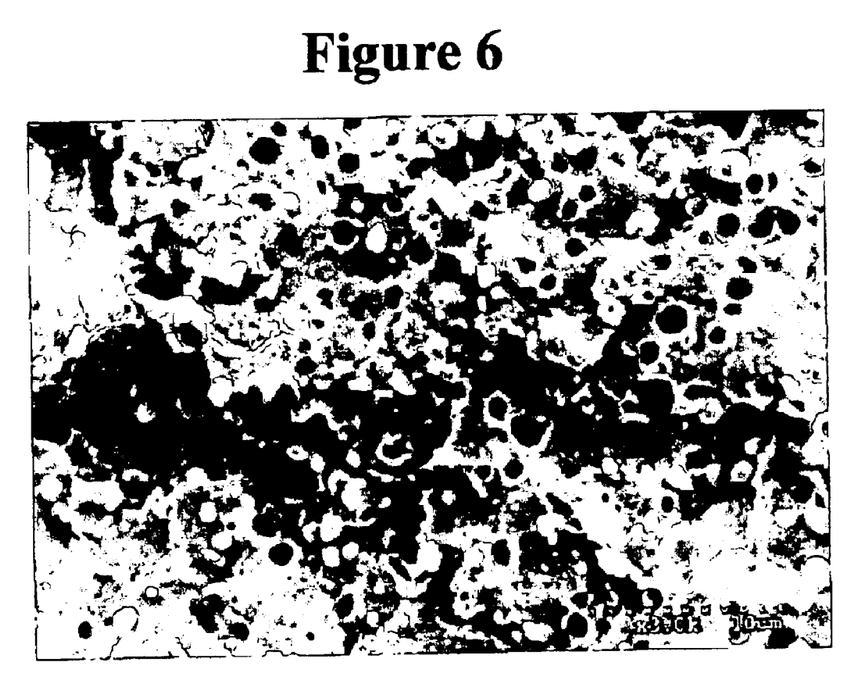
FIG. 6 is a photomicrograph of a 90/10 blend of polybutylene terephthalate and a sodium ionomer of an oxidized propylene homopolymer.

While the physical properties of Samples 1–3 were marginally different compared to the control blend (Comparative Sample 1), there were significant changes in the morphology. Without adding OPP #3 as a compatibilizer, the blend showed poor and non-uniform dispersion of non-oxidized PP in the PBT matrix (FIG. 4). Irregularly shaped domains larger than 10 microns were seen. When the non-oxidized PP was replaced with OPP #3 (FIG. 5) or with the sodium ionomer of OPP #3 (FIG. 6), the blends were more compatible, and smaller domain size was obtained.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A composition comprising:
   (A) an oxidized olefin polymer material containing carboxylic acid groups or derivatives thereof, or an ionomer thereof,
   (B) an engineering thermoplastic, and, optionally,
   (C) a non-oxidized olefin polymer material.

2. The composition of claim 1 wherein the olefin polymer material is selected from the group consisting of a propylene polymer material, an ethylene polymer material, and a butene-1 polymer material.

3. The composition of claim 2 wherein the propylene polymer material is selected from the group consisting of:
   (A) a crystalline homopolymer of propylene having an isotactic index greater than 80;
   (B) a crystalline, random copolymer of propylene and an olefin selected from the group consisting of ethylene and 4–10 C alpha-olefins, provided that when the olefin is ethylene, the maximum polymerized ethylene content is 10% by weight, and when the olefin is a 4–10 C alpha-olefin, the maximum polymerized content thereof is about 20% by weight, the copolymer having an isotactic index greater than 60;
   (C) a crystalline, random terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;
   (D) an olefin polymer composition comprising:
      (1) about 10% to about 60% by weight of a crystalline propylene homopolymer having an isotactic index of at least 80 or a crystalline copolymer of monomers selected from the group consisting of (a) propylene and ethylene, (b) propylene, ethylene and a 4–8 C alpha-olefin, and (c) propylene and a 4–8 C alpha-olefin, the copolymer having a polymerized propylene content of more than 85% by weight and an isotactic index greater than 60.
      (2) about 3% to about 25% by weight of a copolymer of ethylene and propylene or a 4–8 C alpha-olefin that is insoluble in xylene at ambient temperature; and
      (3) about 10% to about 80% by weight of an elastomeric copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity, measured in decahydronaphthalene at 135° C., of about 1.5 to about 4.0 dl/g,
   wherein the total amount of (2) and (3), based on the total olefin polymer composition, is about 50% to about 90%, the weight ratio of (2)/(3) is less than 0.4 and the composition is prepared by polymerization in at least two stages and has a flexural modulus of less than 150 MPa; and
   (E) a thermoplastic olefin comprising:
      (1) about 10% to about 60% of a propylene homopolymer having an isotactic index of least 80 or a crystalline copolymer of monomers selected from the group consisting of (a) ethylene and propylene, (b) ethylene, propylene and a 4–8 C alpha-olefin, and (c) ethylene and a 4–8 C alpha-olefin, the copolymer having a polymerized propylene content greater than 85% and an isotactic index of greater than 60;

(2) about 20% to about 60% of an amorphous copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a polymerized diene, and containing less than 70% polymerized ethylene and being soluble in xylene at ambient temperature; and (3) about 3% to about 40% of a copolymer of ethylene and propylene or a 4–8 C alpha-olefin that is insoluble in xylene at ambient temperature, wherein the thermoplastic olefin has a flexural modulus of greater than 150 but less than 1200 MPa.

4. The composition of claim 3 wherein the propylene polymer material is a propylene homopolymer.

5. The composition of claim 1 wherein the engineering thermoplastic is selected from the group consisting of polyamides, polycarbonates, polyimides, and polyesters.

6. The composition of claim 5 wherein the engineering thermoplastic is a polyamide.

7. A process for preparing a compatible blend of an olefin polymer material and an engineering thermoplastic comprising:

(A) making an oxidized olefin polymer material containing carboxylic acid groups or derivatives thereof, (B) extruding a mixture of (1) the oxidized olefin polymer material from step (A), (2) an engineering thermoplastic, (3) optionally, an inorganic base, and (4) optionally, a non-oxidized olefin polymer material, and (C) recovering a blend of the engineering thermoplastic, the oxidized olefin polymer material or an ionomer thereof, and, optionally, the non-oxidized olefin polymer material.

8. The process of claim 7 wherein the olefin polymer material is selected from the group consisting of a propylene polymer material, an ethylene polymer material, and a butene-1 polymer material.

9. The process of claim 8 wherein the propylene polymer material is selected from the group consisting of:

(A) a crystalline homopolymer of propylene having an isotactic index greater than 80;

(B) a crystalline, random copolymer of propylene and an olefin selected from the group consisting of ethylene and 4–10 C alpha-olefins, provided that when the olefin is ethylene, the maximum polymerized ethylene content is 10% by weight, and when the olefin is a 4–10 C alpha-olefin, the maximum polymerized content thereof is about 20% by weight, the copolymer having an isotactic index greater than 60;

(C) a crystalline, random terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;

(D) an olefin polymer composition comprising:

(1) about 10% to about 60% by weight of a crystalline propylene homopolymer having an isotactic index of at least 80 or a crystalline copolymer of monomers selected from the group consisting of (a) propylene and ethylene, (b) propylene, ethylene and a 4–8 C alpha-olefin, and (c) propylene and a 4–8 C alpha-olefin, the copolymer having a polymerized propylene content of more than 85% by weight and an isotactic index greater than 60;

(2) about 3% to about 25% by weight of a copolymer of ethylene and propylene or a 4–8 C alpha-olefin that is insoluble in xylene at ambient temperature; and (3) about 10% to about 80% by weight of an elastomeric copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity, measured in decahydronaphthalene at 135° C., of about 1.5 to about 4.0 dl/g, wherein the total amount of (2) and (3), based on the total olefin polymer composition, is about 50% to about 90%, the weight ratio of (2)/(3) is less than 0.4 and the composition is prepared by polymerization in at least two stages and has a flexural modulus of less than 150 MPa; and (E) a thermoplastic olefin comprising:

(1) about 10% to about 60% of a propylene homopolymer having an isotactic index of least 80 or a crystalline copolymer of monomers selected from the group consisting of (a) ethylene and propylene, (b) ethylene, propylene and a 4–8 C alpha-olefin, and (c) ethylene and a 4–8 C alpha-olefin, the copolymer having a polymerized propylene content greater than 85% and an isotactic index of greater than 60;

(2) about 20% to about 60% of an amorphous copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a polymerized diene, and containing less than 70% polymerized ethylene and being soluble in xylene at ambient temperature; and (3) about 3% to about 40% of a copolymer of ethylene and propylene or a 4–8 C alpha-olefin that is insoluble in xylene at ambient temperature, wherein the thermoplastic olefin has a flexural modulus of greater than 150 but less than 1200 MPa.

10. The process of claim 9 wherein the propylene polymer material is a propylene homopolymer.

11. The process of claim 7 wherein the engineering thermoplastic is selected from the group consisting of polyamides, polycarbonates, polyimides, and polyesters.

12. The process of claim 11 wherein the engineering thermoplastic is a polyamide.

13. A process for preparing a compatible blend of an olefin polymer material and an engineering thermoplastic comprising:

(A) making an oxidized olefin polymer material containing acid groups or derivatives thereof, (B) optionally, extruding a mixture of the oxidized olefin polymer material from step (A) and an inorganic base to form an ionomer of the oxidized olefin polymer material, and (C) extruding a blend of the oxidized olefin polymer material or an ionomer thereof, an engineering thermoplastic, and, optionally, a non-oxidized olefin polymer material.

14. The process of claim 13 wherein the olefin polymer material is selected from the group consisting of propylene polymer materials, ethylene polymer materials, and butene-1 polymer materials.

15. The process of claim 14 wherein the propylene polymer material is selected from the group consisting of:

(A) a crystalline homopolymer of propylene having an isotactic index greater than 80;

(B) a crystalline, random copolymer of propylene and an olefin selected from the group consisting of ethylene and 4–10 C alpha-olefins, provided that when the olefin is ethylene, the maximum polymerized ethylene content is 10% by weight, and when the olefin is a 4–10 C alpha-olefin, the maximum polymerized content thereof is about 20% by weight, the copolymer having an isotactic index greater than 60;

(C) a crystalline, random terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;

(D) an olefin polymer composition comprising:

(1) about 10% to about 60% by weight of a crystalline propylene homopolymer having an isotactic index of at least 80 or a crystalline copolymer of monomers selected from the group consisting of (a) propylene and ethylene, (b) propylene, ethylene and a 4–8 C alpha-olefin, and (c) propylene and a 4–8 C alpha-olefin, the copolymer having a polymerized propylene content of more than 85% by weight and an isotactic index greater than 60;

(2) about 3% to about 25% by weight of a copolymer of ethylene and propylene or a 4–8 C alpha-olefin that is insoluble in xylene at ambient temperature; and (3) about 10% to about 80% by weight of an elastomeric copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity, measured in decahydronaphthalene at 135° C., of about 1.5 to about 4.0 dl/g, wherein the total amount of (2) and (3), based on the total olefin polymer composition, is about 50% to about 90%, the weight ratio of (2)/(3) is less than 0.4 and the composition is prepared by polymerization in at least two stages and has a flexural modulus of less than 150 MPa; and (E) a thermoplastic olefin comprising:

(1) about 10% to about 60% of a propylene homopolymer having an isotactic index of at least 80 or a crystalline copolymer of monomers selected from the group consisting of (a) ethylene and propylene, (b) ethylene, propylene and a 4–8 C alpha-olefin, and (c) ethylene and a 4–8 C alpha-olefin, the copolymer having a polymerized propylene content greater than 85% and an isotactic index of greater than 60;

(2) about 20% to about 60% of an amorphous copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a polymerized diene, and containing less than 70% polymerized ethylene and being soluble in xylene at ambient temperature; and (3) about 3% to about 40% of a copolymer of ethylene and propylene or a 4–8 C alpha-olefin that is insoluble in xylene at ambient temperature, wherein the thermoplastic olefin has a flexural modulus of greater than 150 but less than 1200 MPa.

16. The process of claim 15 wherein the propylene polymer material is a propylene homopolymer.

17. The process of claim 13 wherein the engineering thermoplastic is selected from the group consisting of polyamides, polycarbonates, polyimides, and polyesters.

18. The process of claim 17 wherein the engineering thermoplastic is a polyamide.

19. A process for preparing an oxidized olefin polymer material comprising:

(A) treating an olefin polymer material with 0.1 to about 4%, based on the weight of the polymer, of an organic peroxide initiator while adding a controlled amount of oxygen so that the olefin polymer material is exposed to a first amount of oxygen of greater than 0.004% and less than 15% by volume, at a temperature of at least 25° C. but below the softening point of the olefin polymer material, (B) heating the oxidized olefin polymer material of step (A) to a second temperature of at least 25° C. but below the softening point of the olefin polymer material, in the presence of a second controlled amount of oxygen greater than 0.004%, but less than 15% by volume, and (C) treating the oxidized olefin polymer material at a temperature of at least 80° C. but below the softening point of the polymer in an inert atmosphere to quench any active free radicals.

20. The process of claim 23 wherein the olefin polymer material is selected from the group consisting of a propylene polymer material, an ethylene polymer material, and a butene polymer material.

21. The process of claim 20 wherein the propylene polymer material is selected from the group consisting of:

(A) a crystalline homopolymer of propylene having an isotactic index greater than 80;

(B) a crystalline, random copolymer of propylene and an olefin selected from the group consisting of ethylene and 4–10 C alpha-olefins, provided that when the olefin is ethylene, the maximum polymerized ethylene content is 10% by weight, and when the olefin is a 4–10 C alpha-olefin, the maximum polymerized content thereof is about 20% by weight, the copolymer having an isotactic index greater than 60;

(C) a crystalline, random terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;

(D) an olefin polymer composition comprising:
  (1) about 10% to about 60% by weight of a crystalline propylene homopolymer having an isotactic index of at least 80 or a crystalline copolymer of monomers selected from the group consisting of (a) propylene and ethylene, (b) propylene, ethylene and a 4–8 C alpha-olefin, and (c) propylene and a 4–8 C alpha-olefin, the copolymer having a polymerized propylene content of more than 85% by weight and an isotactic index greater than 60;
  (2) about 3% to about 25% by weight of a copolymer of ethylene and propylene or a 4–8 C alpha-olefin that is insoluble in xylene at ambient temperature; and
  (3) about 10% to about 80% by weight of an elastomeric copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity, measured in decahydronaphthalene at 135° C., of about 1.5 to about 4.0 dl/g, wherein the total amount of (2) and (3), based on the total olefin polymer composition, is about 50% to about 90%, the weight ratio of (2)/(3) is less than 0.4 and the composition is prepared by polymerization in at least two stages and has a flexural modulus of less than 150 MPa; and (E) a thermoplastic olefin comprising:
  (1) about 10% to about 60% of a propylene homopolymer having an isotactic index of least 80 or a crystalline copolymer of monomers selected from the group consisting of (a) ethylene and propylene, (b) ethylene, propylene and a 4–8 C alpha-olefin, and (c) ethylene and a 4–8 C alpha-olefin, the copolymer having a polymerized propylene content greater than 85% and an isotactic index of greater than 60;
  (2) about 20% to about 60% of an amorphous copolymer of monomers selected from the group consisting of (a) ethylene and propylene, (b) ethylene, propylene, and a 4–8 C alpha-olefin, and (c) ethylene and a 4–8 C alpha-olefin, the copolymer optionally containing about 0.5% to about 10% of a polymerized diene, and containing less than 70% polymerized ethylene and being soluble in xylene at ambient temperature; and
  (3) about 3% to about 40% of a copolymer of ethylene and propylene or a 4–8 C alpha-olefin that is insoluble in xylene at ambient temperature, wherein the thermoplastic olefin has a flexural modulus of greater than 150 but less than 1200 MPa.

22. The process of claim 21 wherein the propylene polymer material is a propylene homopolymer.

* * * * *